Feb. 14, 1939.  J. J. WILLIAMS ET AL  2,147,566
APPARATUS FOR MANUFACTURING METALLIC CLOSURES
Filed Nov. 27, 1936    5 Sheets—Sheet 4
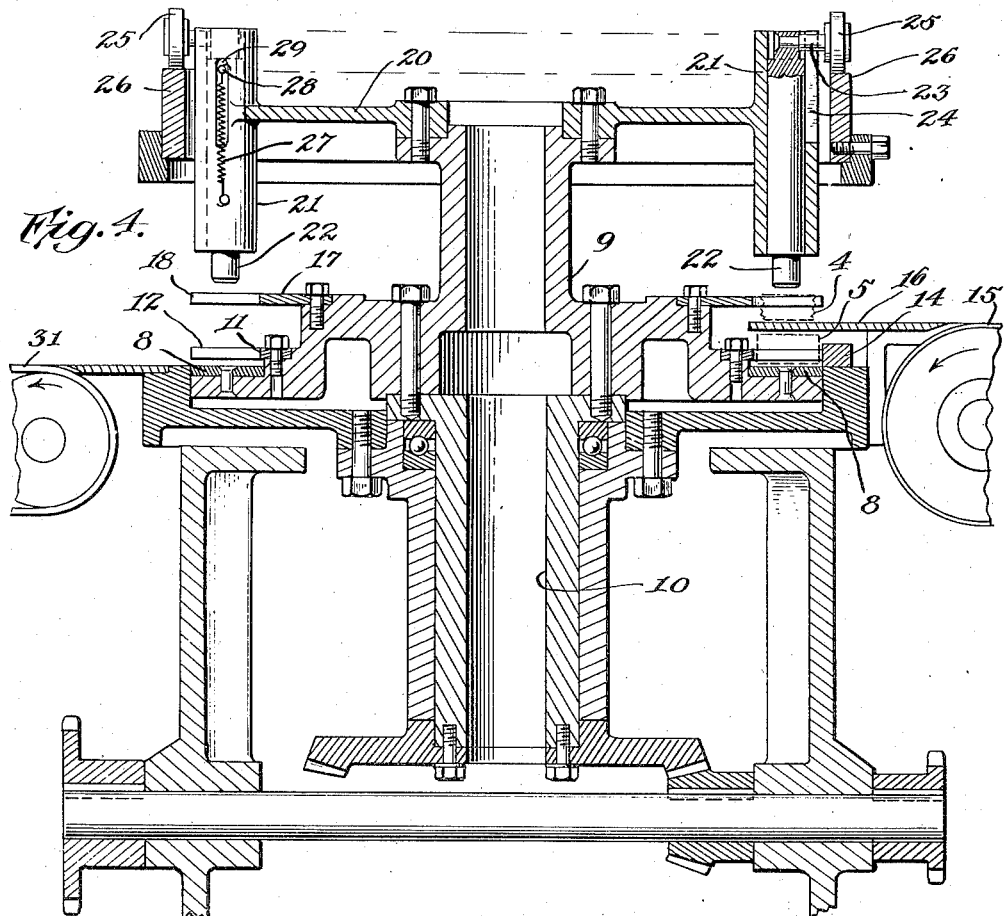
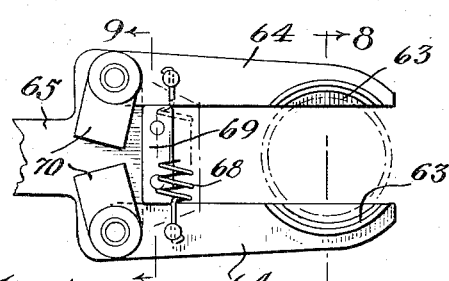
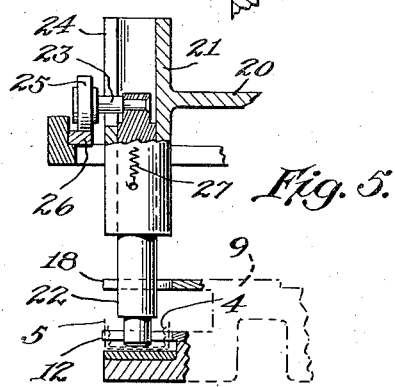
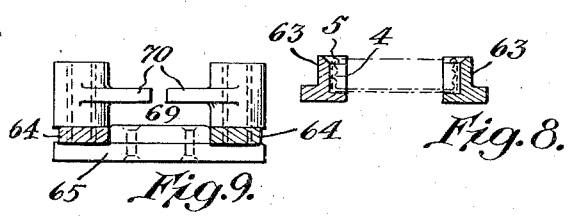
INVENTORS
John J. Williams
Joseph Bauman
BY Eccleston & Eccleston
ATTORNEYS Patented Feb. 14, 1939

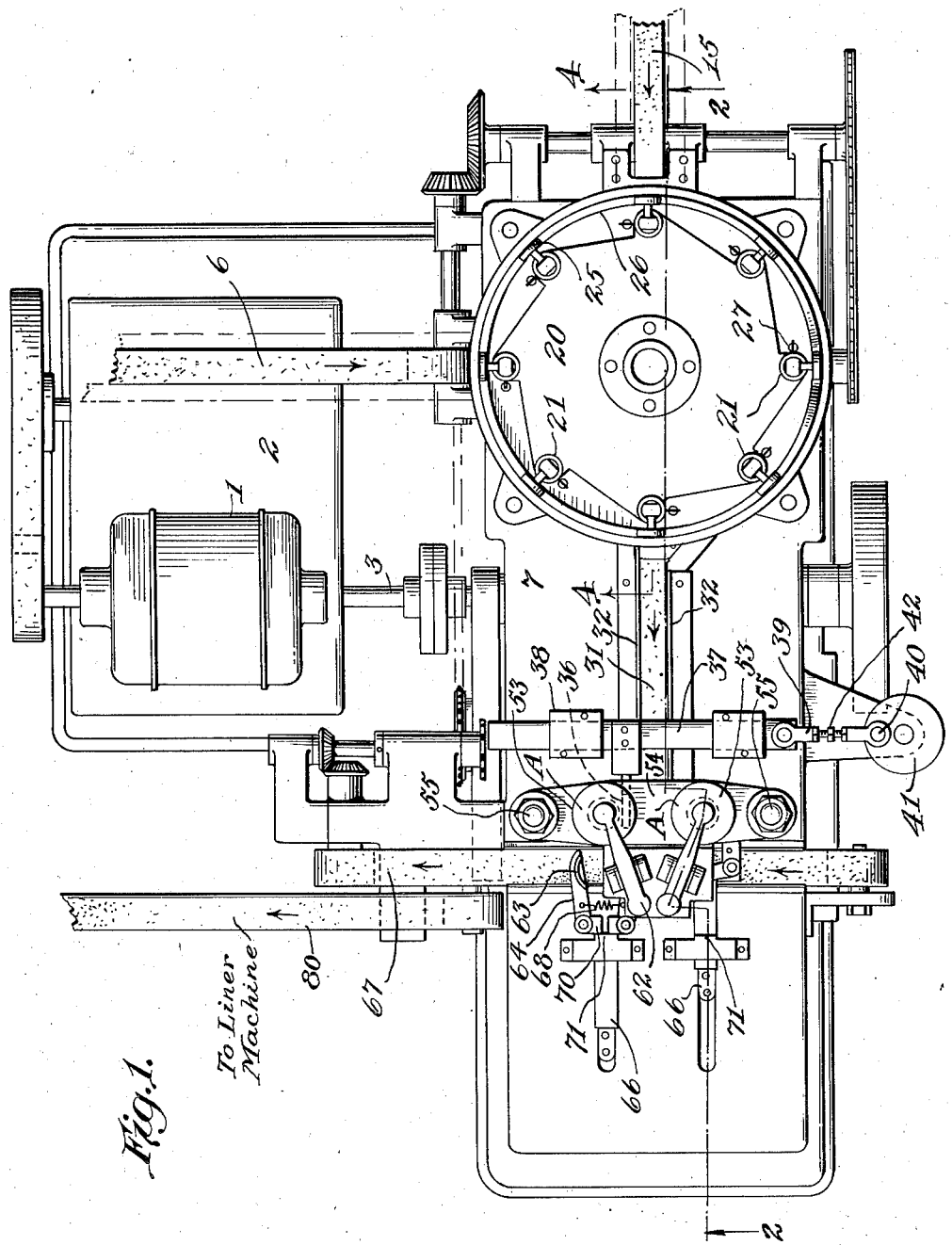

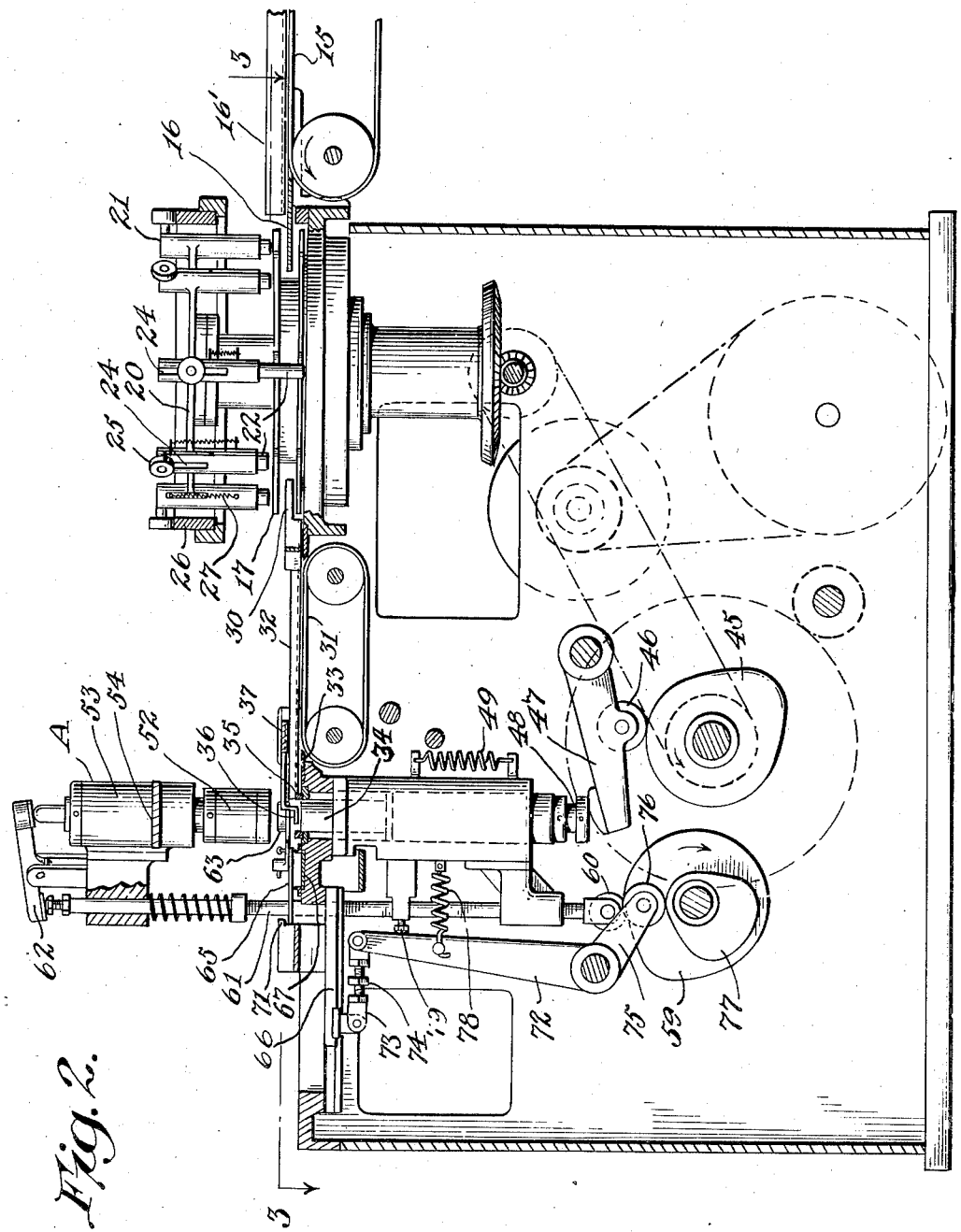

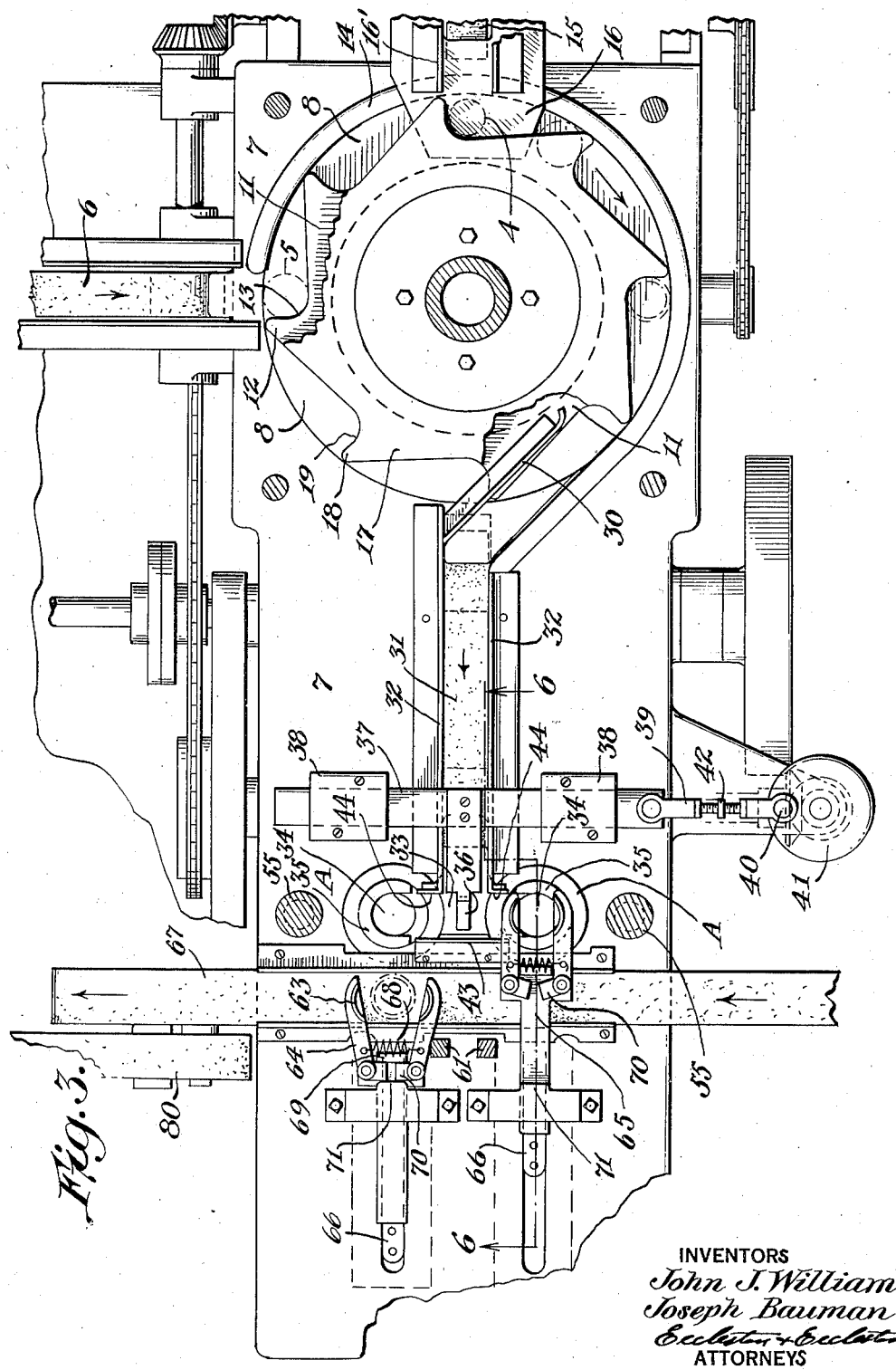

2,147,566

UNITED STATES PATENT OFFICE 2,147,566

APPARATUS FOR MANUFACTURING METALLIC CLOSURES

John J. Williams and Joseph Bauman, Wheeling, W. Va., assignors to Hazel-Atlas Glass Company, Wheeling, W. Va., a corporation of West Virginia Application November 27, 1936, Serial No. 113,080

12 Claims. (Cl. 113—1)

The invention relates primarily to an automatic machine for assembling and uniting the parts of double-shell caps, but certain features of the invention are equally well adaptable to the manufacture of other types of caps.

One of the objects of the invention is to provide a completely automatic machine which will assemble and unite the parts of double-shell caps, thereby avoiding all manual handling of the parts and greatly increasing the rate of production.

A further object of the invention is to provide means for automatically seating the inner shell, to its fullest extent, in the outer shell.

Another object of the invention is to provide two presses to receive the assembled blanks, with means for alternately delivering the assembled blanks to each press.

Still another object of the invention is to provide means for alternately receiving a completed cap from each press and delivering the caps to a conveyer by which they are carried to a liner machine for placing liners in the caps.

Another object of the invention is to provide an automatic machine of this character which though primarily intended for the manufacture of double shell caps, yet can be readily adapted to the manufacture of other types of caps, such as lug caps.

Various other objects and advantages of the invention will be apparent to those skilled in the art, from the following detailed description when taken in connection with the accompanying drawings, in which, Figure 1 is a plan view of the machine.

Figure 2 is a vertical longitudinal sectional view of the machine, with parts shown in elevation, the section being taken on line 2—2 of Figure 1.

Figure 3 is a horizontal sectional view of the machine, taken on line 3—3 of Figure 2.

Figure 4 is a vertical sectional view of the assembling apparatus, taken on line 4—4 of Figure 1.

Figure 5 is a detail view of one of the plungers and associated parts, for seating the inner shell in the outer shell.

Figure 7 is a fragmentary plan view of one of the cap receiving cups.

Figure 8 is a transverse vertical sectional view of the cap receiving cup, taken on line 8—8 of Figure 7; and Figure 9 is a transverse sectional view taken on line 9—9 of Figure 7.

Figure 6:
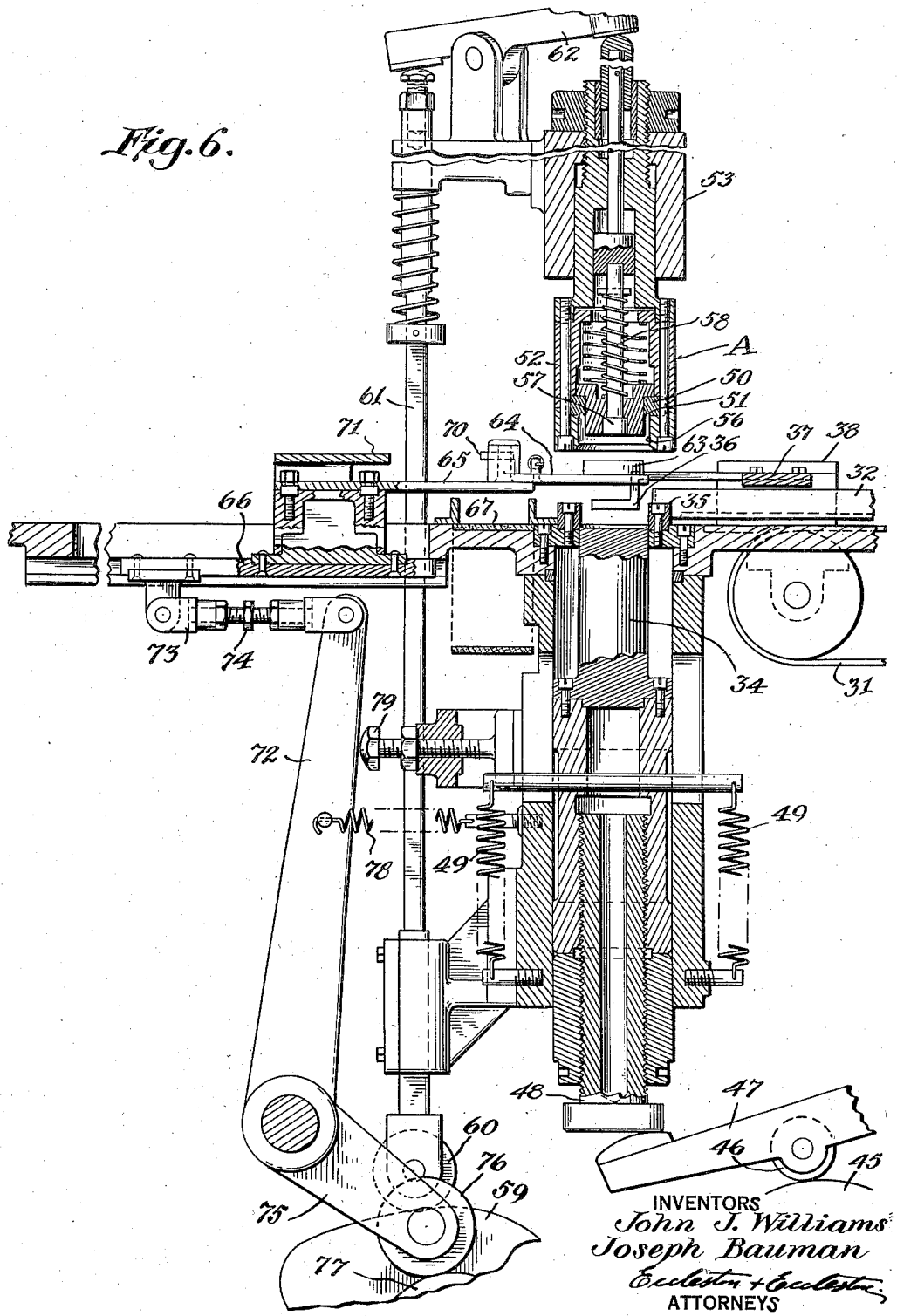
Figure 6 is a vertical sectional view of one of the presses, and associated parts, taken on line 6—6 of Figure 3.

Referring to the drawings in more detail, numeral 1 refers to a motor which through a reduction gear box 2 continuously rotates a main drive shaft 3. This main drive shaft through appropriate gears, sprockets and chains, cams, etc., operates the various conveyers and all other parts of the machine in suitably timed relation. The gearing, etc., has been illustrated in only a very general way and need not be described, for obviously any suitable means may be employed for driving the various parts.

The well known double-shell cap consists of an inner shell 4 which is threaded, and an outer shell 5 in which the inner shell is nested. The two shells are united against relative rotation by curling the free edge portion of the outer shell skirt inwardly about the edge of the inner shell which is usually provided with a bead. The inner and outer shells are shown in dotted lines in Figures 4, 5 and 8. In Figure 4, the shells are not yet assembled; in Figure 5 the shells are assembled but not united, and in Figure 8 the shells are united.

The outer and inner shells are stored in appropriate bins (not shown), from which they are delivered to separate conveyers for carrying them to an assembling apparatus. Numeral 6 refers to a continuously moving belt conveyer which carries the outer shells 5 in a single column from their bin and delivers them across a portion of the table 7 to a plate 8 mounted on a casting 9 which is continuously rotated by shaft 10.

Also mounted on and rotating with the casting 9 and plate 8 is a lower assembly wheel 11 provided with a plurality of fingers 12 forming pockets 13. This lower assembly wheel 11 is only a slight distance above the revolving plate 8, and thus the outer shells 5 are engaged one by one in the pockets 13, and are carried forward in a circular path, being retained in proper position in the pockets by a circular guide member 14.

Numeral 15 refers to a continuously moving belt conveyer which carries the inner threaded shells 4 in a single column from their bin and delivers them to a dead plate 16, across which they are guided by guide members 16'. This plate projects over the lower assembly wheel 11 but is under an upper assembly wheel 17. This upper assembly wheel is also mounted on the casting 9, and is provided with a plurality of fingers 18 forming pockets 19. These fingers and pockets of the upper assembly wheel are exactly the same as those of the lower assembly wheel, and they are in vertical alignment. Thus each pocket 19 picks up an inner shell 4 and carries it forward across the dead plate 16, and immediately below the dead plate is an outer shell 5 in one of the pockets 13 of the lower assembly wheel. Therefore as each inner shell reaches the edge of the dead plate it merely slides off and drops into an outer shell which is immediately below it, and the forward movement of the assembled shells continues.

It is very desirable in the manufacture of caps of this type, that the inner shell be pushed down in the outer shell as far as possible, and means for assuring such an assembled relation between the inner and outer shells will now be described.

Fixed to the casting 9 to rotate therewith is a plate 20, and this plate is provided with a number of vertical plunger casings 21. There is one of these plunger casings for each of the pockets and they are aligned with the pockets, so that in the present instance there are eight of the plunger casings. Mounted for vertical reciprocation in each plunger casing is a plunger 22, and a stud 23 extends outwardly from the plunger through a vertical slot 24 in the plunger casing. Each of these studs carries a roller 25 which rides on a cam track 26. The plungers are normally maintained in a raised position by the cam track, but at a point beyond where the outer and inner blanks are assembled there is a drop in the cam track which permits the plungers to successively drop into the assembled units and thereby force the inner shell as far down as possible in the outer shell. To give a more positive action in the descent of the plungers, each is provided with a spring 27, having its lower end attached to the lower portion of the plunger casing, and its upper end attached to a pin 28 projecting laterally from the plunger through a slot 29 in the casing.

In the continued rotation of the plate 20, the cam track successively lifts the plungers from the the assembled blank units, which continue to travel onward until a guide member 30 guides them from the pockets 13 onto the continuously moving endless belt conveyer 31. This conveyer carries the assembled blank units forward in a single row, between guide rails 32 to a dead plate 22. This dead plate extends between two curling dies or presses which are arranged side by side, and are referred to generally by reference character A.

Each of the presses includes a vertically reciprocable plug or plunger 34, and these plungers when in their lowered position are flush with the dead plate 33. Fixed centering gauges 35 center the assembled blank units on the reciprocable plugs 34, and these gauges are cut away adjacent the dead plate 33, as shown in Figure 3, to permit the assembled blank units to be swept from the dead plate onto the reciprocable plugs, in position for the uniting operation.

Before describing the operation of the presses or dies for uniting the inner and outer blanks, we will first describe the preferred means for alternately delivering the blank units to the plugs 34.

As will appear hereinafter the two presses operate alternately, that is, when one of the plugs 34 is moving upwardly to perform the uniting operation, the other plug is moving downwardly, and thus the blank units must be alternately delivered to the plugs in timed relation with the plug operation. Numeral 36 refers to a depending feed finger mounted on a bar 37 which is reciprocable transversely of the table 7. This bar is mounted in bearings 38, and is reciprocated by means of a connecting rod 39 having one end attached to the bar and its other end attached to the crank pin 40 of a continuously rotating crank 41. The connecting rod is preferably provided with a turn-buckle 42 to adjust the position of the bar 37 and its feeder finger 36; and of course the feeder finger may be adjustably mounted on the bar if desired.

Each assembled blank unit is brought to a stop against a stop bar 43, and as the feeder finger 36 moves in one direction it will deliver a blank unit to one of the plugs or plungers 34, and when the feeder finger moves in the opposite direction another blank unit will have reached the stop bar 43 and it will be delivered to the other plug or plunger 34. Thus the assembled blank units are alternately delivered to the two presses, and of course the operation of the feeder finger is timed with the alternate operation of the presses, so that when a blank unit is delivered to a particular press the plunger 34 of that press will be in its lowered position. The blank units are preferably guided to the plugs by guide bars 44, in conjunction with the stop bar 43, and as stated above the blank units are accurately centered on the plugs, ready for the curling or uniting operation, by the centering gauges 35.

Having described the preferred means for delivering the assembled blank units to the vertically reciprocable plugs 34 of the presses, we shall now describe the preferred construction and operation of one of the presses; it being understood that they are identical in construction, and are operated alternately.

Referring particularly to Figures 2 and 6, the plug 34 is periodically elevated by the continuously revolving cam 45, which is driven from the main drive shaft 3. Engaging the cam is a roller 46 mounted on the lever 47, the free end of the lever engaging the lower end of a rod 48 which is adjustably connected to the plug 34. There are of course two of these cams 45 and associated parts, and the two cams are set 180° apart, so that the plugs are alternately operated. The plugs are preferably moved downward by springs 49.

Numeral 50 refers to a curling ring or die provided with a curling groove 51, and mounted in the die holder 52. This die holder is vertically adjustable in the bearing 53, and the bearings are carried by a cross plate 54 mounted on standards 55. When the plug 34 is elevated the inner and outer assembled shells will be carried upward and the raw edge of the skirt of the outer shell will engage the groove 51 of the curling ring or die 50, whereby the skirt will be curled inward about the edge of the inner shell skirt, or about a bead on the inner shell skirt, thereby locking the two shells together against relative rotation. During this curling operation the outer shell skirt is supported against a supporting ring 56.

The inner and outer shells having been united, the continued rotation of the cam 45 permits the springs 49 to lower the plug 34 to its original position, the completed cap remaining in the curling die. At the proper instant the cap is ejected by a knock-out rod 57. This rod is normally maintained in its elevated or inoperative position by means of a coil spring 58, and is lowered to eject a cap by means of a continuously rotating cam 59. Engaging this cam is a roller 60 mounted on the lower end of a reciprocable rod 61, and the upper end of this rod engages one end of a lever 62, the other end of which lever engages the knock-out rod. Therefore when the rotation of the knock-out cam 59 causes the rod 61 to be raised the knock-out rod 57 is lowered against the pressure of spring 58, to eject the cap, and thereafter the continued rotation of the cam permits the spring to elevate the knock-out rod to its inoperative position. Of course the knock-out cam 59 is so positioned as to cause the ejection of a cap at the required instant, and also of course there are two of these cams for operating the two knock-out rods; the cams being 180° apart in accordance with the previously mentioned alternate operation of the two presses.

In the apparatus disclosed the plugs 34 are elevated to carry the assembled blank units into cooperative relation with the curling die, and that is the preferred construction, but it would be possible to keep the plugs stationary and move the curling dies up and down. Such an arrangement however, would complicate somewhat the handling of the completed caps.

Before describing the preferred apparatus for handling the completed caps, it is desirable to point out how this machine is adapted to the manufacture of other types of caps, such as single shell lug caps. In manufacturing such caps the assembling apparatus is not essential as there is no nesting of one shell within another, but the apparatus may be used for timing the delivery of the single shells from which the lug caps are made. That is, the shells could be carried from a bin by the conveyor 6, and they would be picked up by the pockets 13 of the lower wheel 11, which would deliver them to the conveyor 31 leading to the dead plate 33 with which the feeder finger 36 is associated. The operation of this finger, as previously described, would alternately deliver the single blanks to the two presses. The only change necessary would be in the presses. That is, appropriate mechanism would have to be substituted in the die holders 52 for forming the lugs as the edge of the blank skirt is curled inward; appropriate mechanism for this lug-forming operation being disclosed in the application of William M. Vogel, Ser. No. 672,665, filed May 24, 1933, now Patent Number 2,064,770, and the applications of John J. Williams, Ser. No. 700,900, filed December 4, 1933, now Patent Number 2,094,031, and Ser. No. 671,908, filed May 19, 1933, now Patent Number 2,089,518.

We have already described how the assembled shell units are united and the finished caps are ejected, and we shall now describe the apparatus for receiving the ejected caps and delivering them to a conveyor leading to a liner machine.

There are two receiving cups for receiving the completed caps and delivering them to a conveyer, and they are timed to alternately operate with the alternate operation of the curling presses. The two receiving cups are identical in construction, and a description of one of them will be sufficient. Numeral 63 refers to one of these cups, which are formed of separable halves, carried by arms 64 pivotally mounted on a bracket 65. This bracket is mounted on a slide member 66, and by reciprocating the slide the cup is moved back and forth from a position under the curling die to a position over a continuously moving endless belt conveyor 67.

When a cup is in its advanced position for receiving a completed cap, the parts are as shown in Figure 7. The arms 64 are drawn toward each other by the spring 68, and this movement of the arms toward each other is limited by a block or plate 69. The cup halves are thus properly positioned in spaced relation to receive and hold a completed cap, when the knock-out rod 57 operates to eject a cap from the curling die. The cup having received a cap is now withdrawn to a position over the belt conveyor 67, and just as it reaches this position lugs 70 associated with the cup arms 64 engage a stop bracket 71, thereby throwing the arms further apart, and dropping the cap on the conveyor 67. When the cup is again moved forward the spring 68 returns the cup members into normal relationship for receiving another cap.

The back and forth movement of the cup in proper timed relation, may be accomplished by any desired mechanism. In the preferred embodiment illustrated, the slide member 66 is connected to the upper end of a lever 72 by a connecting rod 73, which is preferably adjustable by means of a turn-buckle 74. The lever 72 is periodically oscillated by means of a lever 75 provided with a roller 76 riding upon a continuously rotating cam 77. The roller is maintained against the cam by a spring 78. Thus the continued rotation of the cam causes the cup to be periodically moved back and forth, in timed relation, between the receiving position beneath the curling die and the discharging position over the conveyor 67. Of course there are two of the cams 77 and associated parts, and they are arranged 180° apart to give the alternate operation previously described. The inward movement of the cups to cap-receiving position is adjustably limited by the set screw 79 which is engaged by the lever 72.

The completed caps are delivered to the continuously moving belt conveyor 67 as previously described, which may carry them forward to a liner machine, or they may be transferred by any ordinary guide means (not shown) to another endless belt conveyor 80 leading to a liner machine. The liner machine automatically positions a liner in each cap, but as automatic liner machines are old, illustration thereof is unnecessary.

As the foregoing description of the preferred embodiment of the invention also includes a description of the operation thereof, no further description is necessary.

It will be apparent that this apparatus will automatically assemble, with great speed and accuracy, the inner and outer shells of double shell caps, will properly seat the inner shell in the outer shell, will alternately deliver the assembled shell units to two curling presses by which the two shells will be united against relative rotation, and will deliver the completed caps to a conveyor to be carried to an automatic liner machine.

It will also be apparent that this machine, which is primarily intended for the manufacture of double shell caps, can readily be shifted to the manufacture of other types of caps, such as lug caps.

While we have described the preferred embodiment of the machine, it is apparent that numerous changes and modifications may be made without departing from the spirit of the invention, and all such changes and modifications are intended to be included within the scope of the appended claims.

What we claim is:

1. Apparatus for manufacturing metallic closures, including two rotatable members, one arranged above the other, a plate, associated with the upper member, means for delivering inner shells to said plate, means for delivering outer shells to the lower member, the upper member sweeping the inner shells from said plate into the outer shells, and means for uniting the two shells against relative rotation.

2. Apparatus for manufacturing metallic closures, including two moving members, one arranged above the other, a plate associated with the upper member, means for delivering inner shells to said plate, means for delivering outer shells to the lower member, the upper member sweeping the inner shells from said plate into the outer shells, means for seating the inner shells as far as possible in the outer shells, and means for uniting the two shells against relative rotation.

3. Apparatus for manufacturing metallic closures, including two rotatable members, one arranged above the other, a plate associated with the upper member, means for delivering inner shells to said plate, means for delivering outer shells to the lower member, the upper member sweeping the inner shells from said plate into the outer shells, means rotatable with said members for seating the inner shells as far as possible in the outer shells, and means for uniting the two shells against relative rotation.

4. Apparatus for manufacturing metallic closures, including two rotatable members, one arranged above the other, a plate associated with the upper member, means for delivering inner shells to said plate, means for delivering outer shells to the lower member, the upper member sweeping the inner shells from said plate into the outer shells, a plurality of plungers movable with said members, and means for successively lowering the plungers to successively seat the inner shells as far as possible in the outer shells, and means for uniting the two shells against relative rotation.

5. Apparatus for manufacturing metallic closures, including means for assembling the two shells of a double-shell cap, two presses for curling a portion of an outer shell about a portion of an inner shell, and a movable finger for delivering assembled shell units to each press alternately.

6. Apparatus for manufacturing metallic closures, including two movable members, one arranged above the other, a plate associated with the upper member, means for delivering inner shells to said plate, means for delivering outer shells to the lower member, the upper member sweeping the inner shells from said plate into the outer shells, a plurality of presses for uniting the two shells against relative rotation, and means for delivering the assembled shell units to the presses.

7. Apparatus for manufacturing metallic closures, including two movable members, one arranged above the other, a plate associated with the upper member, means for delivering inner shells to said plate, means for delivering outer shells to the lower member, the upper member sweeping the inner shells from said plate into the outer shells, two alternately operated presses for uniting the two shells against relative rotation, and means for delivering assembled shell units to each press alternately.

8. Apparatus for manufacturing metallic closures, including means for assembling the inner and outer shells of double-shell caps, a press for uniting the two shells against relative rotation, movable cap receiving means, means for moving the cap receiving means to a position under a cap, means for ejecting a cap from the press to the receiving means, means for moving the receiving means away from the press, and means for opening the cap receiving means to release the cap.

9. Apparatus for manufacturing metallic closures, including means for assembling the inner and outer shells of double-shell caps, two alternately operating presses for uniting the assembled shell units against relative rotation, means for delivering the shell units to each press alternately, cap receiving means for receiving the completed caps from the presses and delivering them to the desired point, and means for moving the cap receiving means back and forth alternately between receiving position and delivery position.

10. Apparatus for manufacturing metallic closures including two alternately operating presses for uniting assembled shells against relative rotation, means for delivering assembled shells to each press alternately, and alternately operated cups receiving the completed caps from the presses and delivering them to the desired point.

11. Apparatus for manufacturing metallic closures, including two movable members, one arranged above the other, a plate associated with the upper member, means for delivering inner shells to said plate, means for delivering outer shells to the lower member, the upper member sweeping the inner shells from said plate into the outer shells, a plurality of presses for uniting the two shells against relative rotation, a conveyer for delivering the assembled shell units to a point adjacent the presses, a finger movable in timed relation with the presses for delivering the assembled shell units to the presses, means for operating the presses, and means operated in timed relation with the presses for receiving the completed caps and delivering them to the desired point.

12. Apparatus for manufacturing metallic closures, including travelling means for assembling in nesting relation the inner and outer shells of double-shell caps, a plunger travelling with said assembling means for seating the inner shells as far as possible in the outer shells, a conveyor receiving the assembled shells, a press for uniting the two shells against relative rotation, and means for delivering the assembled shells from said conveyor to said press.

JOHN J. WILLIAMS.
JOSEPH BAUMAN.